Sept. 16, 1969          G. R. HOSKER          3,467,960
DIGITAL READOUT DEVICE WITH LIGHT GUIDES
Filed Jan. 10, 1966          2 Sheets-Sheet 1
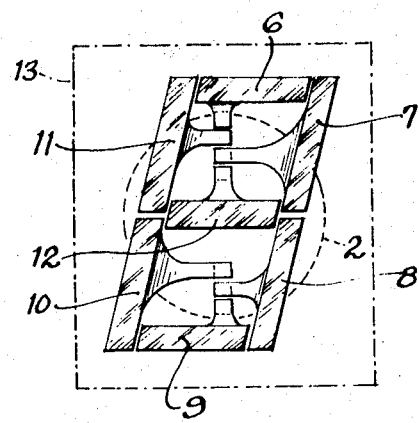
FIG. 1
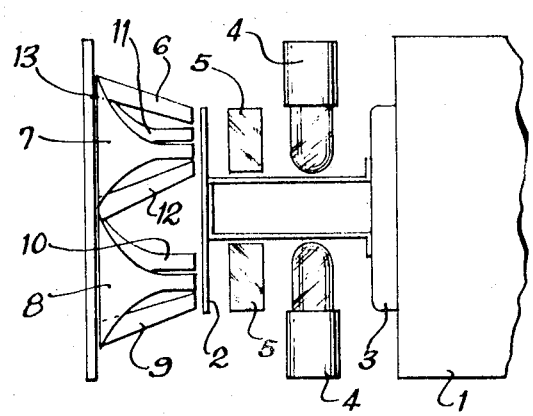
FIG. 2
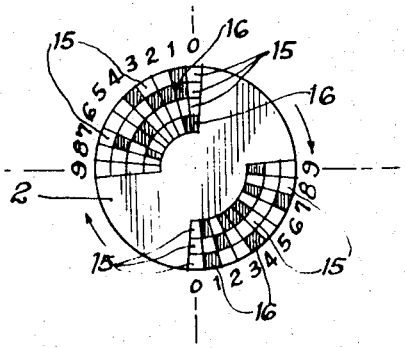
FIG. 3
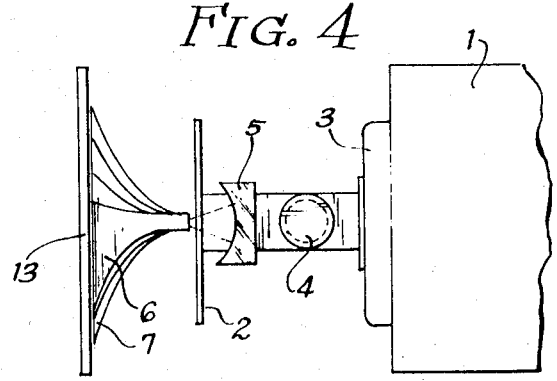
FIG. 4
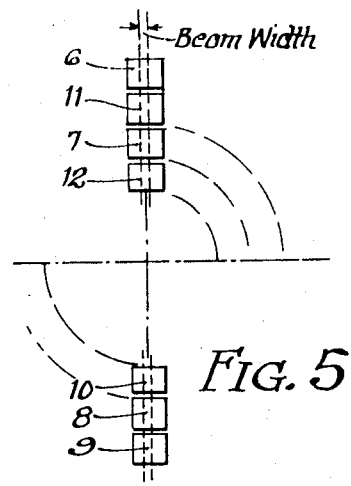
FIG. 5
| Electrical Input | Deflection Angle | Lightguide No. | | | | | | | Display |
|---|---|---|---|---|---|---|---|---|---|
| | | 6 | 7 | 8 | 9 | 10 | 11 | 12 | |
| 0 | 0° | — | I | I | — | I | I | ▦ | 0 |
| 1 | 10° | ▦ | I | I | — | I | I | ▦ | 1 |
| 2 | 20° | — | I | I | — | I | — | ▦ | 2 |
| 3 | 30° | — | I | I | — | I | I | — | 3 |
| 4 | 40° | ▦ | I | I | — | I | I | — | 4 |
| 5 | 50° | — | I | I | — | I | I | — | 5 |
| 6 | 60° | — | I | I | — | I | I | — | 6 |
| 7 | 70° | — | I | I | — | I | ▦ | ▦ | 7 |
| 8 | 80° | — | I | I | — | I | I | — | 8 |
| 9 | 90° | — | I | I | — | I | ▦ | — | 9 |
FIG. 6
INVENTOR
Gerald R. Hosker
by McDougall, Hersh
and Scott Attys INVENTOR
Gerald R. Hosker
by McDougall, Hersh & Scott
Attys though fluctuating measurements can be made as rapidly as the movement itself can respond. Loading of the moving system by, for example, mounting a shutter on its shaft, can be reduced to a satisfactorily low level.

United States Patent Office
3,467,960
Patented Sept. 16, 1969

3,467,960
DIGITAL READOUT DEVICE WITH LIGHT GUIDES
Gerald R. Hosker, London, Ontario, Canada, assignor to American Gage & Machine Company, Chicago, Ill., a corporation of Illinois
Filed Jan. 10, 1966, Ser. No. 519,596
Int. Cl. G08b 5/36
U.S. Cl. 340—378        9 Claims

ABSTRACT OF THE DISCLOSURE

A digital readout device associated with a condition responsive apparatus wherein a plurality of light guides define rectangular outer faces and are arranged in the configuration of the numeral 8 and are separated so that different numbers can be displayed depending upon which of the light guides are illuminated. A source of light is provided for the light guides, and a shutter is interposed between the light source and the opposite ends of the light guides. Apertures are defined by the shutter, and the shutter is connected to the condition responsive device so that movements imparted to the shutter will change the position of the apertures whereby different ones of the light guides will be illuminated.

SPECIFICATION

This invention relates to a construction adapted to display digital information. The construction of this invention particularly comprises a digital display device which is adapted to reliably display numerical values while at the same time comprising an extremely compact and relatively simple structure.

Where it is important to minimize the possibility of reading errors, the display of numerical information in digital form is now often preferred to a presentaton in analog form. In this context, analog presentation is regarded as the display of any quantity (e.g., m.p.h., r.p.m., voltage, etc.) in terms of the linear or angular displacement of a pointer with respect to a calibrated scale. Conventionally, readings may be made to several significant figures either by observing major and minor graduations or by estimated interpolation between graduations.

With care, the analog method can provide reasonably accurate determinations from relatively simple and compact apparatus, and the method is useful in presenting quantities which are fluctuating up and down in value. However, the visual and mental operations involved in making a reading tend to introduce the chance of error in observation. This hazard is further increased if several calibrated scales are superimposed or if several scale ranges are used with a single set of graduations or if very accurate readings must be made rapidly under unfavorable conditions and by unskilled persons.

In such circumstances, digital presentation has the advantage that, although interpolation is no longer possible, neither is there any possibility of misinterpretation. When the information is presented in actual numbers, no observational error is possible short of misreading. The accuracy or resolution is determined only by the quantity of digits in the display and the precision of the circuits which operate the readout. For precise readings, several digits may need to be displayed and such a presentation is essentially more complex and expensive than with analog methods, however, in suitable circumstances, this higher expense can be justified.

A variety of display devices have previously been developed to meet the need for digital presentation. Each of these prior systems is characterized by certain disadvantages including the necessity for employing high operating voltages, the necessity for utilizing relatively complex and reliable mechanisms, and such prior systems are also often characterized by unduly bulky structures.

It is a general object of this invention to provide a digital display device which is adapted to overcome the disadvantages of various prior art systems.

It is a more particular object of this invention to provide a display device which is adapted to display information in numerical form whereby the information can be accurately read and recorded.

It is a further object of this invention to provide a display device of the type described which is adapted to be operated in conjunction with a relatively simple operating circuit wherein high operating voltages are not required.

It is an additional object of this invention to provide a digital display device of the type described which is characterized by a relatively compact construction and which includes relatively simple and extremely reliable operating components.

These and other objects of this invention will appear hereinafter and for purposes of illustration, but not of limitation, specific embodiments of this invention are shown in the accompanying drawings in which:

FIGURE 1 comprises a front elevational view of an assembly of light guide means adapted to be employed for displaying the numerical values;

FIGURE 2 is a side elevational view of an arrangement of components adapted to be utilized in the construction of this invention;

FIGURE 3 comprises an illustration of the face of a shutter means of the type employed in the construction of this invention;

FIGURE 4 comprises a top view of the arrangement illustrated in FIGURE 2;

FIGURE 5 comprises a diagrammatic illustration of the ends of light guide means demonstrating the manner in which the light guides are employed in the construction;

FIGURE 6 comprises a table illustrating the relationship between the light guides, the shutter mechanism, and the numerical values to be displayed;

Figure 7:
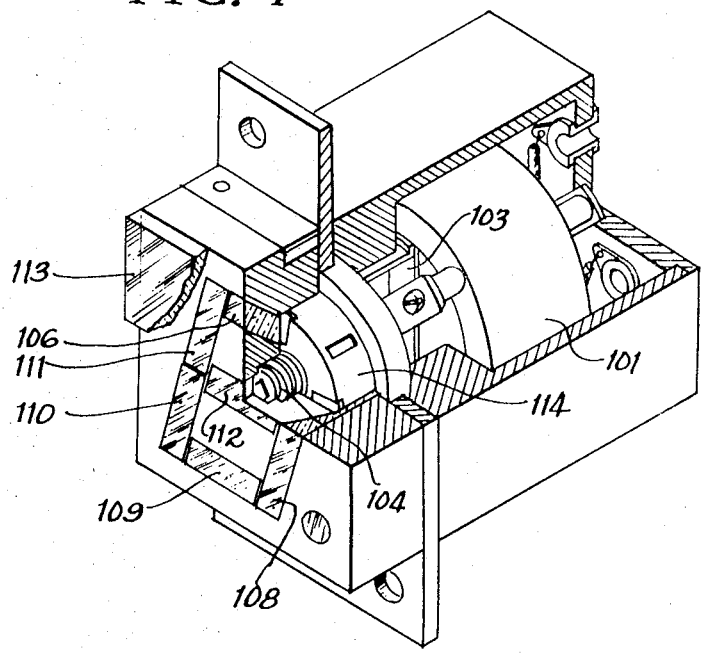
FIGURE 7 is a perspective view, partly in section, illustrating a modified form of the invention.

One basic concept characterizing the new digital display device of this invention is illustrated by the association of the device with the remarkably high sensitivity of the D'Arsonval meter movement as an electromechanical transducer. Such movements commonly furnish a 90° pointer deflection with an electrical power input in the order of five microwatts. Practical sensitivities may range higher or lower than this according to application but it must be presumed that mechanical loading of the moving system must be very small. If the mechanical loading condition can be satisfied, such a movement offers the prospect of a digital display device in which the power level to be switched to transfer from numeral to numeral can be extremely low and can be furnished at a conveniently low voltage level so as to be compatible with semiconductor circuit components.

In accordance with this invention, a D'Arsonval movement or similar arrangement acts to effect a translation into numbers through a system wherein deflections of the movement modify light beams from which the images of numerals may be formed. Interruption or other modification of a light beam involves no significant burden and can be accomplished by a shutter rotated by the movement armature. In turn, the shutter can be of low mass and will permit the movement to respond accurately and rapidly to an electrical signal applied to it.

In practice, the circuits furnishing the input signals to the digital display device will have properties which will result in the actual signal levels to be in error to some extent. As will appear, the display device of this invention is either intrinsically tolerant of these errors or is able to make suitable corrections.

The accompanying drawings illustrate specific embodiments of the instant invention. In describing the invention, reference will be made to the use of an arrangement of light guides disposed to provide a 7-bar configuration. This comprises a well-known arrangement whereby each of the 10 numerical figures can be conveniently displayed. It will be appreciated that the concepts of this invention are readily applicable to other light guide configurations.

The basic mode of operation of the constructions of this invention is illustrated in FIGURE 2 where it will be seen that a D'Arsonval movement (1) is provided with a shutter 2 which is attached to, and rotates with the movement armature 3. On the side of the shutter adjacent to the movement there are positioned bulbs 4 which provide light sources, and also lens systems 5 which are so arranged to produce radially disposed beams of light which are very narrow in the plane of the shutter. On the remote side of the shutter, there is arranged a system of light guides 6 through 12, with one guide being provided for each of the seven bars to be used in the simulation of the numerals. The outer ends of these light guides terminate in a single plane behind a diffusing screen 13. The inner ends of the guides are disposed, in two groups, to lie along the line of the narrow beams of light generated by the lamps and lenses.

The shutter 2 is furnished with a series of perforations 15 arranged in rows concentric with the movement axis and coinciding with the inner terminations of the several light guides. These perforations are in effect the code by which the inner ends of combinations of the light guides are exposed to illumination and thereby generate a pattern of illuminated bars upon the diffusing screen, according to the angular deflection of the D'Arsonval movement. Thus, the shutter perforations might be arranged as shown in FIGURE 3 so that with no signal applied to the D'Arsonval movement (and, therefore, with zero deflection) the inner terminations of light guides 6, 7, 8, 9, 10 and 11 are exposed to the light source but 12 is cut off by the shutter portion 16. This will result in illumination reaching the diffusing screen as a series of bars simulating the numeral 0. The application of a certain nominal signal to the movement could cause the shutter to rotate so as to bring a fresh arrangement of perforations into effect thereby illuminating 7 and 8 but cutting off the light to 6, 9, 10, 11 and 12 whereby a representation of the numeral 1 will appear. The shutter perforations may be arranged so that the remaining numerals up to 9 will appear in turn as deflection current to the movement is increased. FIGURE 5 illustrates the inner ends of the guide 6 through 12 and superimposing of the shutter 2 of FIGURE 3 on FIGURE 5 illustrates the manner in which the shutter passes or blocks light to achieve the desired numerical display.

Numerous alternative physical arrangements are possible and larger numbers of elements than seven may be encoded. The table provided in FIGURE 6 contains the essential information for a 7-bar configuration, using a D'Arsonval movement with a nominal maximum deflection of 90°. The clear areas in the columns of the table indicate that a perforation 15 is provided by the shutter while the shaded areas indicate that a blocking portion 16 is provided by the shutter.

The shutter perforations 15 may be of such a size that the appropriate light guides remain illuminated for a significant amount of angular deviation of shutter position on either side of the nominal deflection for the display of any particular numeral. In this manner, it is possible to accomplish transfer of the display from one numeral to the next with a change in the deflection of the D'Arsonval movement equivalent to the effective angular width of the light beam at the surface or in the plane of the shutter.

Since it is impractical to make a light beam infinitely narrow, it will be evident that there is a practical limit to the smallest angular movement of the shutter to accomplish a change in the display. For example, the lamp and lens system may produce a beam of a width equivalent to 2° of angular deflection of the D'Arsonval movement at the surface of the shutter. This also represents the amount of rotation of the shutter in which the grouping of illuminated light guides can be changed to alter the display from one numeral to the next. The related shutter openings can now be such that a given numeral can be displayed unchanged for values of deflection on either side of the nominal point up to ½ $(A-a)$ where A is the nominal interval from one numeral to the next and $a$ is the angular width of the light beam. The following table illustrates the sequence occurring in a typical system:

| Deflection (deg.) | | Display condition |
|---|---|---|
| Nominal | Actual | |
| 0 | 0–4 | Numeral 0. |
| | 4–6 | Transfer 0 to 1. |
| 10 | 6–14 | Numeral 1. |
| | 14–16 | Transfer 1 to 2. |
| 20 | 16–24 | Numeral 2. |
| etc. to . . . | | |
| 80 | 76–84 | Numeral 8. |
| | 84–86 | Transfer 8 to 9. |
| 90 | 86–90 | Numeral 9. |

It will be apparent from the foregoing tabulation that any given numeral will be displayed unchanged for 4° on either side of the nominal angular deflection for that numeral. If the D'Arsonval movement is assumed to have a linear relationship between angular deflection and applied current, it follows that such a display device affords a tolerance of ±4.4 percent (full scale current) at each of the nominal current levels associated with the display of the numerals 0 to 9.

It will be noted that only 4° of deflection variation is allowed for the numerals 0 and 9 (as distinct from 8° for all others). This, however, is not an actual limitation since there is no requirement for further downward deflection at 0° or for upward deflection at 90°. At either point, if there were need, the normal under- and overscale swing of about 4° could be provided before mechanical stops prevent further deflection.

Figure 8:
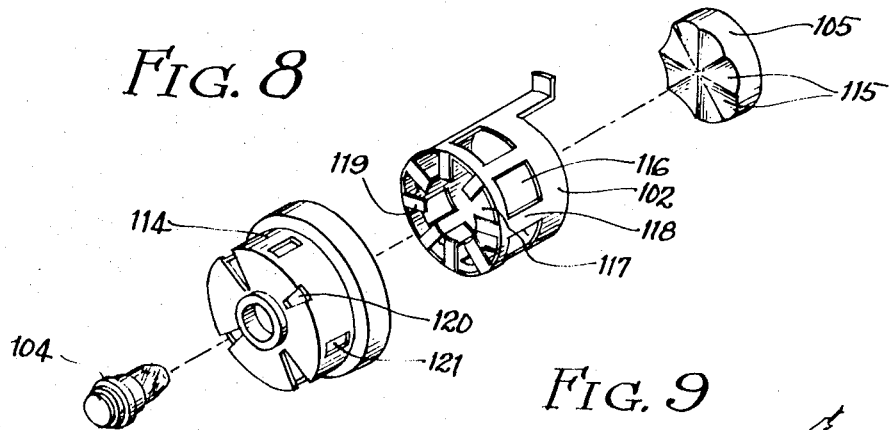
FIGURE 8 is an exploded view illustrating elements employed for illuminating the light guides in the construction of FIGURE 7; and, FIGURE 9 is an exploded view illustrating the components employed for illuminating a decimal point adapted to be utilized in the construction.
Figure 9:
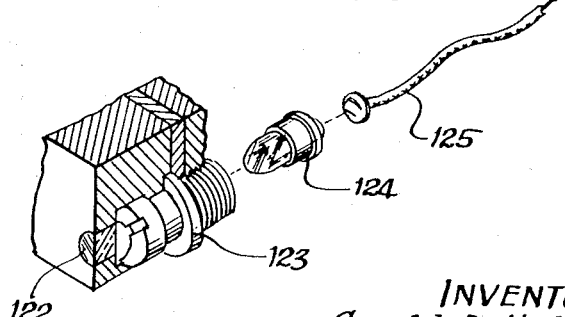

Many variations are possible in the mechanical design of digital display devices characterized by the features of this invention. FIGURES 7, 8 and 9 illustrate a suitable design wherein only a single lamp is employed for illumination of the figures.

The construction of FIGURE 7 includes generally the same elements as employed in the previous construction. A D'Arsonval movement 101 is provided with a shutter 102 (FIGURE 8), and this shutter rotates in conjunction with the armature 103. A bulb 104 is mounted axially of the movement, and the light is directed rearwardly through the shutter onto the face of a reflecting means 105. Light guides 106 through 112 are situated to provide a 7-bar configuration for displaying numerical values. A transparent face plate 113 is provided for the construction.

The shutter 102 is in the form of a drum rather than a disc, and narrow light beams are formed by the reflecting surfaces 115 of the mirror 105 rather than by lenses. Openings 116 and 117 of the shutter 102 serve to transmit the light. Blocking members 118 and 119 are located between the openings.

In a system of the type illustrated, there is a likelihood that light scatter will occur outside the desired beam. A mask member 114 illustrated in FIGURE 8 can be utilized to shut off the undesired ray. This mask member defines a plurality of openings 120 and 121, and the ends of the respective light guides can be positioned in direct alignment with these openings. When the shutter 102 permits the passage of light, one of the openings 120 and 121 will pass the light to the light guide while blocking off undesired rays.

FIGURE 9 illustrates an arrangement which can be employed for providing a decimal point. A cylindrical member 122 is located in the front face of the device, and this member may be of the same material as the light guides. A socket 123 is provided for a bulb 124 which can be energized through a suitable electrical lead 125. It will be obvious when considering the construction of this invention that a plurality of the devices can be located in side-by-side relationship to provide for the display of any desired number of figures. The decimal point can be illuminated selectively depending upon the values to be displayed.

The principle of operation of the structure shown in FIGURES 7, 8 and 9 is as described above. The design is equally adaptable to a larger number of lamps or to additional elements in the displayed patterns. A total of 16 elements can be employed to give good presentation of conventional Arabic numerals rather than the acceptable but angular-appearing multibar configuration. The method is equally adaptable to alphabetical displays or to combinations with numerals, conventionally known as alphanumeric.

If desired, the shutter can be furnished with apertures which communicate with photoelectric cells whereby outgoing electrical signals may be generated in sympathy with the angular deflection of the D'Arsonval movement and with the numeral being displayed. Such signals may be fed to the related circuitry either to render the system self-checking or, in some cases, to accomplish the arithmetic process of "carrying" between units/tens, etc., in a multidigit readout.

In the foregoing description of the device, the light source has been illustrated as a conventional filament bulb. These components may have extremely long life when correctly manufactured and operated, and this long life is best achieved when the bulb operates constantly rather than being switched on and off frequently as in certain other types of digital display devices. When desired, other sources of radiant energy may be used (e.g., ultraviolet, nuclear radiation, etc.), employing an essentially similar technique and with visible characters produced by fluorescence at the viewing screen.

It will be noted that a single light source does not permit the display of an incorrect numeral as is possible when a single lamp fails in a multilamp display. Even when two light sources are used in the type of device here described, it is readily possible to provide an arrangement in which, in the event of one lamp failing, the displayed image is evidently incomplete rather than being possibly anomalous because of failure of illumination to one element. If, for example, the bars designated 6, 7, 11 and 12 are operated from one source and those designated 8, 9 and 10 from the other, the observed image will be recognizably incomplete and an anomalous reading will be impossible.

Other useful variations of the basic principles are possible. For example, the D'Arsonval movement will generally be preferred because of its excellent sensitivity. However, other rotational movements might be employed such as the moving iron or dynamometer types. Alternatively, a movement giving a linear rather than a rotational motion could be used with a suitably perforated shutter. Equally, the shutter could be replaced in any construction by a suitably designed lens system, though it would usually be important to avoid burdening the movement with excessive weight.

Further refinements may be added to augment the usefulness of such a display device. As noted, photoelectrically generated signals may be fed into the related circuit so as to "hold" a given displayed numeral until a "command" signal permits the display to change. A similar function can be achieved by a brake, possibly operated electromagnetically, which will hold a given deflection of the movement.

If direct operation from "BCD" type signals (e.g., signals of essentially equal magnitude but having the significance of 1, 2, 4 or 8 units) is desired, the deflection coil of the movement can be furnished with taps at various numbers of turns so that specific angular deflection (corresponding with the display of numerals of the related numerical significance) will be produced when these signals are applied either singly or in combination to produce any of the numerals 0 to 9.

It will be appreciated that the references herein to light guides are intended to cover a variety of elements suitable for this purpose. Specifically, the light guides may comprise a solid transparent material such as plastic or glass. Fibrous materials have also been employed for such purposes. It is also contemplated that the guides may comprise hollow passages through which light is directed by means of suitably shaped and positioned reflecting or diffusing surfaces. Where radiation other than light characterizes the operation of the device, the guides will naturally comprise a material suitable for such purposes. In considering the appended claims, it will be understood that the term "light" is employed for convenience and is intended to include other types of radiation.

The digital display device described is characterized by many advantages. The device will display any of the numerals 0 to 9 (or other desired characterizations) according to specific electrical signals furnished to it. It is very sensitive in that the maximum level of signal to be provided can lie in the region of a few microwatts. The device will respond to a very small change in signal level to transfer the display from one numeral to the next, yet in percentage terms, it is substantially tolerant of any need for exact levels of applied signals. The device is compatible with the types of signals conventionally delivered by the "calculating" part of the electronic system usually associated with digital readout and requires no coding or programming matrix. Furthermore, the device is capable of responding to signals of voltage and current levels normally encountered in semiconductor circuitry.

Excellent lamp life is provided in that the source of illumination operates constantly while the device is in use. Anomalous displays can be avoided by reason of lamp failure since any such failure is readily apparent. No connections or interaction between the lamp and actuating circuits are included in the system. The device will respond rapidly and precisely to actuating signals because the sensitive mechanism is not subjected to significant mechanical loading. It has been observed that the device is inherently reliable, and it is also compact and capable of being constructed to withstand unfavorable operating conditions. The information density is well related to the panel space used and a satisfactory ratio of digit size to digit spacing is readily obtained for easy legibility. Efficient use is made of the lamp light output and adequate image brilliance is achieved without excessive self-heating.

It will be understood that various changes and modifications may be made in the devices described which provide the characteristics of this invention without departing from the spirit thereof particularly as defined in the following claims.

That which is claimed is:

1. A digital display device adapted to be associated with a condition responsive apparatus whereby different numerical values can be displayed in accordance with changes in conditions, said device comprising a plurality of light guides defining outer faces arranged to form a configuration defining the number eight and whereby combinations of said guides are adapted to form different numerals depending upon which light guides are illuminated, a light source, light directing means adapted to direct light to said light guides, shutter means interposed between said light source and said light guides for selectively directing said light with respect to said light guides, said light guides comprising relatively small inner ends adapted to be algned with respect to each other adjacent said shutter, and wherein said light guides taper outwardly toward their opposite ends to form rectangular outer faces, said condition responsive apparatus having a rotary member which moves in response to condition changes, and means connecting said shutter means to said shaft for movement of the shutter means with the shaft whereby different ones of said combinations are formed by said light guides in response to said changes.

2. A device in accordance with claim 1 wherein said light directing means comprises a lens arrangement located between said light source and said shutter means.

3. A device in accordance with claim 1 wherein said light directing means comprises a mirror arrangement having a plurality of separate light directing surfaces.

4. A device in accordance with claim 1 wherein said device is associated with a D'Arsonval movement, and wherein said shutter is attached to an armature situated for rotary movement about the axis of said movement.

5. A device in accordance with claim 1 wherein said light source is mounted coaxially with said movement, a mirror means defining a plurality of separate reflecting surfaces located in line with light source whereby a plurality of separate light beams are reflected by said mirror means, said shutter means and said inner ends of said light guides being arranged around said light source out of the path of the direct beam from said light source and within the path of said separate beams.

6. A device in accordance with claim 5 including a mask member interposed between said shutter means and said inner ends of the light guides, said mask member defining openings adapted to transmit said separate beams of light to said inner ends while blocking off undesirable rays of light.

7. A device in accordance with claim 1 including a separate light source and light guide member, said light guide member defining a decimal point on the face of said device whereby said decimal point is adapted to be illuminated.

8. A device in accordance with claim 1 wherein the full extent of said meter movement is divided into a plurality of separate sections, and wherein the number of numerals adapted to be displayed by said device corresponds to the number of said sections, each of said numerals being adapted to be displayed whenever said meter movement falls within one of said sections.

9. A device in accordance with claim 8 wherein said means connected to said meter movement for selectively directing said light comprises a shutter means, said shutter means defining a plurality of openings whereby light is adapted to be transmitted to said light guides through the openings in said shutter means.

References Cited
UNITED STATES PATENTS

| | | | |
|---|---|---|---|
| 3,174,144 | 3/1965 | O'Neill | 340—324 |
| 3,253,274 | 5/1966 | Berman | 340—380 X |
| 3,331,299 | 7/1967 | Morgan | 340—324 X |
| 3,349,406 | 10/1967 | Perry et al. | 340—347 X |

MAYNARD R. WILBUR, Primary Examiner

MICHAEL K. WOLENSKY, Assistant Examiner

U.S. Cl. X.R.

340—324, 336, 347, 380; 350—96